United States Patent [19]

Beavon

[11] 4,094,961
[45] June 13, 1978

[54] HYDROGEN SULFIDE PRODUCTION

[75] Inventor: David K. Beavon, Pasadena, Calif.

[73] Assignee: Ralph M. Parsons Company, Pasadena, Calif.

[21] Appl. No.: 521,831

[22] Filed: Nov. 7, 1974

[51] Int. Cl.² .......................................... C01B 17/16
[52] U.S. Cl. .................................. 423/564; 423/416; 423/443; 423/572
[58] Field of Search ............... 423/564, 563, 437, 416, 423/443

[56] References Cited

U.S. PATENT DOCUMENTS

| | | | |
|---|---|---|---|
| 2,965,455 | 12/1960 | Maude | 423/564 |
| 3,454,354 | 7/1969 | Kerr | 423/564 |
| 3,495,941 | 2/1970 | Van Helden | 423/564 |
| 3,579,302 | 6/1971 | Sefton | 423/563 |
| 3,794,710 | 2/1974 | Merrill | 423/220 |
| 3,961,035 | 6/1976 | Mickley | 423/563 |

FOREIGN PATENT DOCUMENTS 1,211,033  11/1970  United Kingdom.

Primary Examiner—L. Dewayne Rutledge
Assistant Examiner—Michael L. Lewis
Attorney, Agent, or Firm—Christie, Parker & Hale

[57] ABSTRACT

A reducing gas stream containing hydrogen, carbon monoxide and water, as steam, is passed through a molten sulfur to vaporize sulfur. The gas stream containing the vaporized sulfur is passed through a catalytic conversion zone where at a controlled temperature of from about 500° to about 800° F sulfur is converted to hydrogen sulfide. The introduced steam optionally coupled with a water quench following hydrogenation of sulfur serves to suppress carbonyl sulfide and carbon disulfide formation.

13 Claims, 1 Drawing Figure

U.S. Patent  June 13, 1978  4,094,961
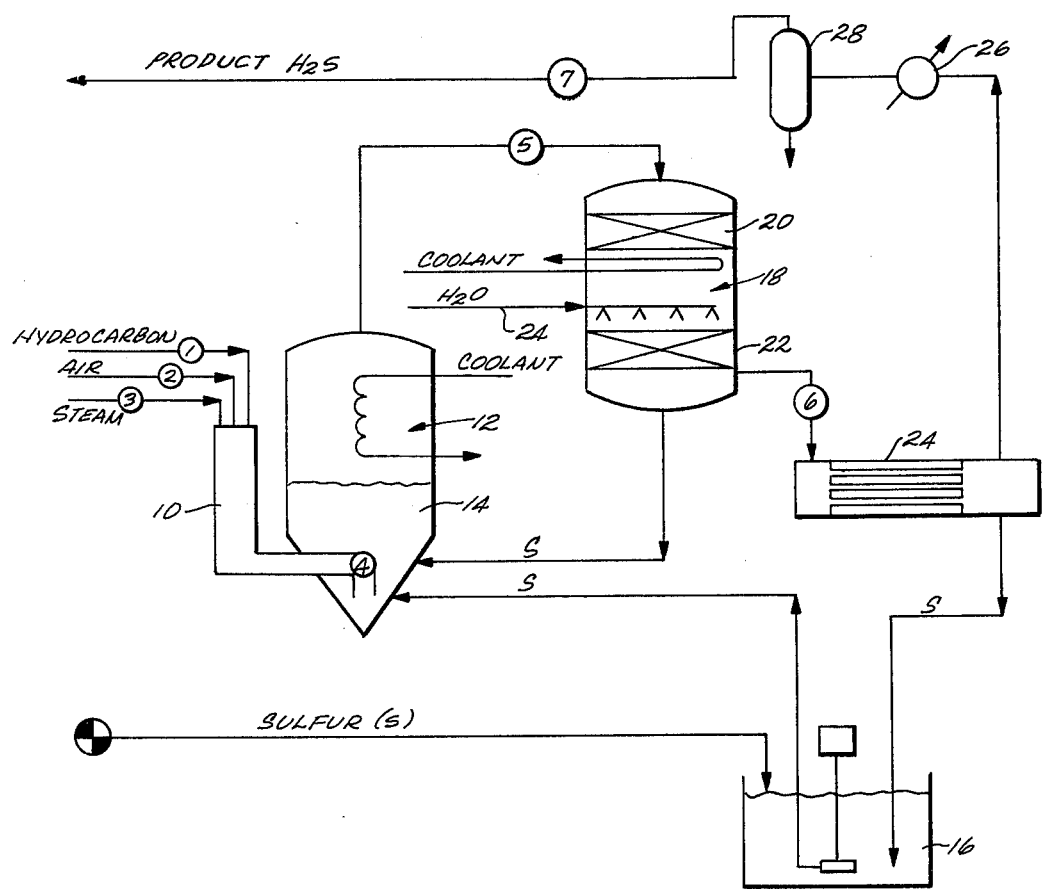

HYDROGEN SULFIDE PRODUCTION

BACKGROUND OF THE INVENTION

Many processes such as the Citrate process involve an absorption solution where sulfur dioxide is absorbed from the gas stream, and where hydrogen sulfide is added to the absorption solutions to form sulfur by the reaction $$2H_2S + SO_2 \rightleftarrows 3S° + 2H_2O. \qquad (1)$$

The process which has a continuous demand for hydrogen sulfide can readily be met by the sulfur formed in the reaction.

One method for producing hydrogen sulfide from the sulfur has been described in the "Canadian Mining and Metallurgical Bulletin", October 1957, page 614 and following. This involved the non-catalytic direct reaction of hydrogen with sulfur to form hydrogen sulfide at temperatures from 820° to 1000° F.

An admitted deficiency in the process is that reaction products are highly corrosive. Type 316 stainless steel, for instance, suffers severe corrosion. Another deficiency of the process is that hydrogen of high purity is required, and this is expensive.

In addition, unreacted sulfur vapor in the hot gases causes fouling and plugging of condensers when the gas stream is cooled to the dew point of water to enable the hydrogen sulfide to react with sulfur dioxide in the aqueous phase.

In the January 1970 edition of "Mining Engineering" at page 75 and following, there was published a Bureau of Mines Process for producing hydrogen sulfide. The first stage of the reaction occurs at a temperature of 600° to 700° C (1112° to 1292° F) using alumina as the catalyst where methane and sulfur react to form hydrogen sulfide by the principal reaction:

$$CH_4 + 4S \rightleftarrows 2H_2S + CS_2. \qquad (2)$$

The second stage reaction is at a temperature of 200° to 300° C (392° to 572° F) where carbon disulfide reacts with water to form hydrogen sulfide and carbon dioxide by the principal reaction:

$$CS_2 + H_2O \rightarrow 2H_2S + CO_2. \qquad (3)$$

In addition to sharing the serious corrosion problems with the previously described process as represented by the mixture of sulfur and hydrogen sulfide at temperatures in excess of 900° F, the carbon disulfide is formed initially in high amounts. When lower temperatures are used in the succeeding step the approach to a new equilibrium is poor because carbonyl sulfide and carbon disulfide only hydrolyze slowly to hydrogen sulfide. Thus, the unconverted carbon disulfide and any carbonyl sulfide formed are inert and represent a pollution problem in any process where the hydrogen sulfide is used.

SUMMARY OF THE INVENTION

According to the present invention there is provided a process for the production of high purity hydrogen sulfide from sulfur.

As a first step in the process, there is formed a reducing gas in a reducing gas generator by the partial combustion of a carbonaceous fuel such as methane in a deficiency of a source of oxygen, typically air. The reductants formed include hydrogen and carbon monoxide. Water, as steam, may be combined with the feed to the partial combustion zone to suppress the formation of soot, react with carbon monoxide at least in a subsequent catalyst zone to generate hydrogen for reaction with sulfur, and to hydrolyze any carbonyl sulfide and carbon disulfide formed in side reactions.

The reducing gas is passed through a sulfur vaporization zone and contacted with molten sulfur to vaporize sulfur. In the preferred embodiment, the rate of reducing gas flow through the molten sulfur and/or temperature are controlled such that the resultant gas stream will contain sufficient hydrogen equivalents, principally in the form of free hydrogen and carbon monoxide, for the catalytic hydrogenation of vaporized sulfur to hydrogen sulfide in a subsequent catalytic conversion zone. Normally a mole ratio of hydrogen equivalents to vaporized sulfur, calculated as $S_1$, of 1:1 will suffice. A mole ratio of 1.15 to about 1.3 is, however, preferred to insure conversion of all of the sulfur and any sulfur dioxide which may be present to hydrogen sulfide.

Conversion of the sulfur to hydrogen sulfide occurs catalytically at a temperature from about 500° to about 800° F. The catalysts employed are those containing the metals of Group Va, VIa, VIII and the Rare Earth series of the Periodic Table as defined by Mendeleef and published as the "Periodic Chart of the Atoms" by W. N. Welch Manufacturing Company as published in Business Week, Apr. 10, 1965 edition, on page 56 incorporated therein by reference. The metals are preferably supported on conventional supports such as silica, alumina, alumina-silica and the zeolites. Alumina is the preferred support. The preferred catalysts are those containing one or more of the metals cobalt, molybdenum, iron, chromium, vanadium, thoria, nickel, tungsten (W) and uranium (U). A cobalt-molybdate catalyst where support is alumina is particularly preferred.

In addition to causing the hydrogenation of elemental sulfur to hydrogen sulfide at the temperatures employed, the catalyst serves to hydrolyze any COS and $CS_2$ present or formed to hydrogen sulfide. The water required for hydrolysis may be provided from initially introduced steam and/or water introduced to the catalysis zone normally as a quench to control reaction temperature. As indicated, the water present in the catalytic conversion zone also reacts with carbon monoxide to form hydrogen for reaction with sulfur.

The catalysis zone is provided with external cooling to maintain temperature in the desired range. This may take the form of indirect cooling by the circulation of an external coolant through the catalysis zone or direct cooling by introduction of water spray.

Conversion of sulfur in the catalyst zone is complete. This enables any water present to be condensed without the formation of plugging conditions. Sulfur dioxide formation is avoided. If present, any trace amounts are hydrogenated to hydrogen sulfide.

In addition to totally avoiding the corrosion problems inherent in prior art processes, the amount of carbon-sulfur compounds in the product gas stream is reduced to negligible quantities.

THE DRAWING

The attached drawing illustrates a flow diagram for the process of this invention.

DESCRIPTION

With reference to the attached Drawing a fuel gas, typically a gaseous hydrocarbon such as methane, ethane, propane and the like, and a source of oxygen, typically air and stream are combined in a reducing gas generator 10 where there is formed a reducing gas stream containing as hydrogen equivalents, hydrogen and carbon monoxide. The water present in the feed serves to reduce the formation of soot. It is also available to generate hydrogen by reaction with carbon monoxide in a subsequent catalysis zone and to suppress the formation of COS and $CS_2$.

The reducing gas generator 10 operates at an elevated temperature yielding by partial oxidation an effluent gas stream typically ranging in temperature from about 1400 to about 1600° F or more.

Liquid fuels such as kerosine, diesel fuel or other fuel oils may be used with burners designed to suppress the formation of soot. Solid fuel such as coal or coke may alternatively be used as the source of hydrogen and carbon monoxide.

The gas stream enters sulfur vaporizer 12 containing a pool of molten sulfur 14 supplied by molten sulfur reservoir tank 16.

The gas stream in passing through the molten sulfur vaporizes the sulfur and passes it to a catalytic reactor 18 where hydrogen and sulfur react to form hydrogen sulfide and carbon monoxide and water react to yield additional hydrogen for reaction with sulfur to yield hydrogen sulfide.

The amount of sulfur vaporized, calculated as $S_1$ independent of its dimeric or polymeric forms, should be equal to or less than the amount of hydrogen equivalents present in the gas stream exiting the gas generator. Preferably, the net gas should contain hydrogen equivalents in the form of hydrogen and carbon monoxide in an amount sufficient to provide excess hydrogen equivalents in an amount of from about 1.5 to about 3 mole per cent to insure complete conversion of the vaporized sulfur to hydrogen sulfide and to eliminate any sulfur dioxide which may tend to form.

The control of sulfur vaporization can be accomplished in several ways. One is by injecting stream or water into the vapor space of vessel 12, thereby cooling the vapor and condensing excess sulfur vapor.

The same result may be accomplished by cooling the sulfur pool 14 by an external coolant (not shown) to again limit the temperature of the gas above the pool of molten sulfur.

Another means as shown in the drawing is to cool the gas stream above the pool of molten sulfur by the introduction of an external coolant through a coil or tube to limit gas temperature and thereby the partial pressure of sulfur in gas which is in thermal equilibrium with the molten sulfur head.

Whichever expedient is employed the net gas stream containing the reducing agents, water to suppress the thermal formation of COS and $CS_2$ and vaporized sulfur are passed to catalytic convertor 18.

As shown, converter 18 contains two catalytic beds 20 and 22 with cooling between the beds. The catalysts employed in the beds are those containing the metals of Group Va, VIa, VIII and the Rare Earth series of the Periodic Table as defined by Mendeleef and published as the "Periodic Chart of the Atoms" by W. N. Welch Manufacturing Company as published in Business Week, Apr. 10, 1965 edition, on page 56 incorporated therein by reference. The metals are preferably supported on conventional supports such as silica, alumina, alumina-silica and the zeolites. Alumina is the preferred support. The preferred catalysts are those containing one or more the metals cobalt, molybdenum, iron, chromium, vanadium, thoria, nickel, tungsten (W) and uranium (U). A cobalt-molybdate catalyst where support is alumina is particularly preferred.

Catalytic zone 18 is maintained at a temperature from about 500° to about 800° F. As shown in the Drawing bed 20 principally serves for the hydrogenation of sulfur although some hydrolysis of any COS and $CS_2$ introduced will also occur.

To remove the exothermic heat of reaction a coolant can be circulated between beds 20 and 22. Preferably, in addition to or as an alternative to the circulation of an external coolant, water is injected into the gas stream in line 24. Water serves to quench the reaction by removing heat and to promote hydrolysis of COS and $CS_2$ in bed 22 which also serves to convert any residual sulfur to hydrogen sulfide.

To minimize the carbon-sulfur compounds, it is preferred that the gas stream entering catalysis zone 18 have an effective water vapor content of about twenty-five mole percent or more, If the end use of the $H_2S$ containing product gas permits a larger content of COS and $CS_2$, then a lesser content of water vapor is permissible. The lower limit is about ten mole percent. Reaction occurs in catalytic zone 18 at a pressure ranging from about 1 to about 10 atmospheres or more.

The gas stream exiting reactor 18 is passed through sulfur cooler 24 which is made available for start-up and upset conditions to remove any excess sulfur which may be present in the gas stream. Again, because of low operating temperatures, ordinary material of construction can be used since corrosion ceases to be a problem.

The gas stream still above the dew point of water is then passed to heat exchanger 26 where the gas stream is cooled to a temperature below the dew point of water at operating pressures. Water is collected in knock-out pot 28 and removed from the system.

EXAMPLE

With reference to the Drawing there is fed to the reducing gas generator 10 gas streams indentified as 1, 2 and 3 in Table I below which show operating pressures and temperatures at the several points in the process, as calculated by conventional methods.

In reducing gas generator 10, methane and oxygen react to provide hydrogen and the oxides of carbon with attendant production of water. The gas leaving the reactor at point 4 is of the composition shown in Table I and at a temperature of 1507° F.

Molten sulfur at a temperature of 280° F is fed from reservoir 16 to vaporizer 12 at the rate of 6208 pounds per hour, which is equal to the rate of sulfur vaporization. The feed to reactor 18, containing cobalt and molydenum on alumina as the catalyst, is of the composition shown as item 5 in Table I and at a temperature of 665° F. To remove the heat of reaction and promote hydrolysis of COS and $CS_2$ there is introduced water in line 24 at a temperature of 100° F. and at a rate of 200 pound moles per hour. A portion of the introduced water and water present at the reaction feed are consumed in a production of additional hydrogen by reaction with carbon monoxide to yield hydrogen and to hydrolyze COS and $CS_2$. The effluent from the reactor is at a temperature of 750° F. and is of the composition in point 6. The composition of product gas after removal of water is shown at point 7.

The gas stream leaving reactor 18 is free of sulfur dioxide. The concentration of COS is 1210 ppm and the concentration of $CS_2$ is 0.2 ppm.

TABLE I

| Stream No. | 1 | 2 | 3 | 4 | 5 | 6 | 7 |
|---|---|---|---|---|---|---|---|
| Name | Fuel Gas | Air (Dry) | Steam | Red'g Gas | Reactor Feed | Reacted Mix | Product Gas |
| Pound mole | | | | | | | |
| $CH_4$ | 76.4 | | | 0.09 | 0.09 | 0.02 | 0.02 |
| $H_2$ | | | | 140.3 | 140.3 | 7.02 | 7.02 |
| CO | | | | 60.7 | 60.7 | 0.26 | 0.26 |
| $CO_2$ | | | | 15.5 | 15.5 | 75.43 | 75.42 |
| $H_2O$ | | | 25.6 | 37.6 | 37.6 | 177.60 | 32.60 |
| $O_2$ | | 51.9 | | 0.00 | 0.00 | 0.00 | 0.00 |
| $N_2$ | | 197.5 | | 197.5 | 197.5 | 197.50 | 197.50 |
| $H_2S$ | | | | | | 193.42 | 193.41 |
| COS | | | | | | 0.58 | 0.58 |
| $CS_2$ | | | | | | 0.00 | 0.00 |
| $SO_2$ | | | | | | 0.00 | 0.00 |
| $S_{vapor}$ [1] | | | | | 97.0 | 0.00 | 0.00 |
| Total | 76.4 | 249.4 | 25.6 | 451.69 | 548.69 | 651.83 | 506.81 |
| Total[2] | | | | | | 474.23 | 474.21 |
| Temp. °F | 300 | 300 | 300 | 1507 | 665 | 750 | 100 |
| Press.ATA | 1 | 1 | 1 | 1 | 1 | 1 | 1 |
| Parts per Million (Dry Basis) | | | | | | | |
| COS | | | | | | 1210 | |
| $CS_2$ | | | | | | 0.2 | |
| $SO_2$ | | | | | | 0.0 | |

[1] As equivalent $S_2$
[2] Dry Basis

What is claimed is:

1. A process for the production of hydrogen sulfide from elemental sulfur which comprises:
   (a) forming a reducing gas containing hydrogen and carbon monoxide by combustion of a carbonaceous fuel in the presence of an amount of oxygen insufficient for complete oxidation of the carbonaceous fuel;
   (b) passing the reducing gas through a sulfur vaporization zone containing molten sulfur to simultaneously cool the reducing gas and vaporize sulfur while further cooling the sulfur vaporization zone to provide a resultant gaseous mixture containing hydrogen, carbon monoxide and sulfur vaporized by the reducing gas in which the mole ratio of the sum of the hydrogen and carbon monoxide to vaporized sulfur, calculated as $S_1$, in the resultant gas stream is at least approximately 1.15; and
   (c) combining the resultant gaseous mixture with water in an amount sufficient to form a mixture having a water vapor content of at least 10 mole percent in a catalytic conversion zone wherein the sulfur is essentially completey hydrogenated to hydrogen sulfide at a temperature maintained from about 500 to about 800° F by reaction with the hydrogen present in the reducing gas and hydrogen formed by the reaction of water with the carbon monoxide present in the reducing gas in the presence of a catalyst consisting of at least one supported metal selected from Group Va, VIa, and VIII and the Rare Earth Series of the Periodic Table.

2. A process as claimed in claim 1 in which the catalyst consists of cobalt and molybdenum deposited on alumina.

3. A process as claimed in claim 1 in which the mole ratio is from about 1.15:1 to about 1.3:1.

4. A process for the production of hydrogen sulfide from elemental sulfur which comprises:
   (a) combusting a carbonaceous fuel in the presence of steam with a source of oxygen in an amount insufficient for complete combustion of the carbonaceous fuel in a reducing gas zone to form a reducing gas containing hydrogen, carbon monoxide and water;
   (b) passing the reducing gas through a sulfur vaporization zone containing molten sulfur to simultaneously cool the reducing gas and vaporize sulfur while further cooling the sulfur vaporization zone to provide a resultant gaseous stream containing hydrogen, carbon monoxide, water and the vaporized sulfur in which the mole ratio of the sum of hydrogen and carbon monoxide to sulfur, calculated as $S_1$, is at least about 1.15 and the water content is at least 10 mole percent; and
   (c) passing the resultant gaseous mixture to a catalytic conversion zone wherein the sulfur is essentially completely hydrogeanted to hydrogen sulfide at a temperature from about 500° to about 800° F by reaction with the hydrogen present in the reducing gas and hydrogen formed by the reaction of water with carbon monoxide present in the reducing gas in the presence of a catalyst consisting of at least one supported metal selected from Group Va, VIa, VIII and the Rare Earth Series of the Periodic Table.

5. A process as claimed in claim 4 in which the catalyst consists of cobalt molybdenum deposited on alumina.

6. A process as claimed in claim 5 in which the mole ratio is from about 1.15:1 to about 1.3:1.

7. A process for the production of hydrogen sulfide from elemental sulfur which comprises:
   (a) forming a reducing gas containing hydrogen and carbon monoxide by combustion of a liquid carbonaceous fuel in the presence of water, as steam, and an amount of oxygen insufficient for complete oxidation of the carbonaceous fuel;
   (b) passing the reducing gas through a sulfur vaporization zone containing molten sulfur to simultaneously cool the reducing gas and vaporize sulfur and form a resultant gaseous mixture containing hydrogen, carbon monoxide, sulfur and water;

(c) passing the resultant gaseous mixture through a further cooling zone above the molten sulfur to condense excess sulfur to provide a mole ratio of the sum of hydrogen and carbon monoxide to vaporized sulfur, calculated as $S_1$, of at least 1.15 and a water content of at least 10 mole percent; and (d) combining the further cooled resultant gaseous mixture in a catalytic conversion zone wherein the sulfur is hydrogenated to hydrogen sulfide at a temperature from about 500° to about 800° F by reaction with the hydrogen present in the reducing gas and hydrogen formed by the reaction of water with carbon monoxide present in the reducing gas in the presence of a catalyst consisting of at least one supported metal selected from Group Va, VIa, VIII and the Rare Earth Series of the Periodic Table.

8. A process as claimed in claim 7 in which the catalyst consists of cobalt and molybdenum deposited on alumina.

9. A process as claimed in claim 7 in which the mole ratio is from about 1.15:1 to 1.3:1.

10. A process for the production of hydrogen sulfide from elemental sulfur which comprises:

(a) combusting a liquid carbonaceous fuel, with a source of oxygen in an amount insufficient for complete oxidation of the carbonaceous fuel in the presence of steam in a reducing gas generating zone to completely gasify the fuel and form a reducing gas containing hydrogen, carbon monoxide and water;

(b) passing the reducing gas through a sulfur vaporization zone containing molten sulfur to simultaneously cool the reducing gas and vaporize sulfur and form a resultant gaseous stream containing hydrogen, carbon monoxide, water and sulfur;

(c) passing the resultant gaseous mixture through a further cooling zone above the molten sulfur to condense excess sulfur to provide a mole ratio of the sum of hydrogen and carbon monoxide to vaporized sulfur, calculated as $S_1$, of at least 1.15 and a water content of at least 10 mole percent; and (d) passing the resultant further cooled resultant gaseous mixture to a first catalytic stage of a two state catalytic conversing zone, each stage containing a catalyst containing at least one supported metal selected from Group Va, VIA, VIII and the Rare Earth Series of the Periodic Table, wherein the sulfur is completely hydrogenated to hydrogen sulfide at a temperature from about 500 to about 800° F by reaction with the hydrogen present in the reducing gas and hydrogen formed by the reaction of water with carbon monoxide in the reducing gas in said first stage;

(e) introducing water as a quench to said catalytic conversion zone between the first and second stages to control the temperature of the reactants; and (f) passing the gas stream from said first stage and the added water in the second stage wherein carbonyl sulfide and carbon disulfide present in the gas stream are hydrolyzed to hydrogen sulfide.

11. A process as claimed in claim 10 in which the catalyst consists of cobalt and molybdenum deposited on alumina.

12. A process as claimed in claim 10 in which the molar ratio is from about 1.15:1 to 1.3:1.

13. A process for the production of hydrogen sulfide from elemental sulfur which comprises:

(a) combusting a liquid carbonaceous fuel in the presence of steam with a source of oxygen in an amount insufficient for complete combustion of the carbonaceous fuel in a reducing gas zone to form a reducing gas containing hydrogen, carbon monoxide and water;

(b) passing the reducing gas through a sulfur vaporization zone containing molten sulfur to simultaneously cool the reducing gas and vaporize sulfur while further cooling the sulfur vaporization zone to provide a resultant gaseous stream containing hydrogen, carbon monoxide, water and the vaporized sulfur in which the mole ratio of the sum of hydrogen and carbon monoxide to sulfur, calculated as $S_1$, is at least about 1.15 and the water content is at least 10 mole percent; and (c) passing the resultant gaseous mixture to a catalytic conversion zone wherein the sulfur is hydrogenated to hydrogen sulfide at a temperature from about 500° to about 800° F by reaction with the hydrogen present in the reducing gas and hydrogen formed by the reaction of water with carbon monoxide present in the reducing gas in the presence of a catalyst consisting of at least one supported metal selected from Group Va, VIa, VIII and the Rare Earth Series of the Periodic Table.

* * * * *

UNITED STATES PATENT AND TRADEMARK OFFICE
CERTIFICATE OF CORRECTION

PATENT NO. : 4,094,961
DATED : June 13, 1978
INVENTOR(S) : David K. Beavon

It is certified that error appears in the above-identified patent and that said Letters Patent are hereby corrected as shown below:

Column 1, line 46, " $CS_2 + H_2O \rightarrow 2H_2S + CO_2.$ "
should read as -- $CS_2 + H_2O \rightleftharpoons 2H_2S + CO_2.$ --.
Column 3, line 44, for "stream" read -- steam --.
Column 4, line 25, for "more," read -- more. -- Column 5, line 52, for "completey" read -- completely --.
Column 6, line 43, for "hydrogeanted" read -- hydrogenated --. Column 7, line 45, for "conversing" read
-- conversion --; line 47, for "VIA" read -- VIa --.
Column 8, line 1, delete "completely".

Signed and Sealed this

Twelfth Day of December 1978

[SEAL]

Attest:

RUTH C. MASON
Attesting Officer

DONALD W. BANNER
Commissioner of Patents and Trademarks